(12) United States Patent
Tonazzi et al.

(10) Patent No.: US 7,012,729 B2
(45) Date of Patent: Mar. 14, 2006

(54) NON PLANAR MIRRORS WITH PLANAR ELECTROCHROMIC CAVITY

(75) Inventors: Juan Carlos Lopez Tonazzi, Tucson, AZ (US); Anoop Agrawal, Tucson, AZ (US); Robert S. LeCompte, Tucson, AZ (US)

(73) Assignee: Electro ChromiX, Inc., Tucson, AZ (US)

( * ) Notice: Subject to any disclaimer, the term of this patent is extended or adjusted under 35 U.S.C. 154(b) by 0 days.

(21) Appl. No.: 10/855,284

(22) Filed: May 27, 2004

(65) Prior Publication Data

US 2004/0240029 A1 Dec. 2, 2004

Related U.S. Application Data

(60) Provisional application No. 60/474,653, filed on May 30, 2003.

(51) Int. Cl.
*G02F 1/15* (2006.01)

(52) U.S. Cl. .................. 359/265; 359/273; 359/839

(58) Field of Classification Search ........ 359/265–275, 359/839
See application file for complete search history.

(56) References Cited

U.S. PATENT DOCUMENTS

| | | | |
|---|---|---|---|
| 4,652,090 A | 3/1987 | Uchikawa et al. | |
| 4,676,601 A | 6/1987 | Itoh et al. | |
| 4,712,879 A | 12/1987 | Lynam et al. | |
| 4,902,108 A | 2/1990 | Byker | |
| 4,906,075 A * | 3/1990 | Matsumiya | 359/267 |
| 5,233,461 A | 8/1993 | Dornan et al. | |
| 5,729,379 A | 3/1998 | Allemand et al. | |
| 5,998,617 A | 12/1999 | Srinivasa et al. | |
| 6,039,390 A | 3/2000 | Agrawal et al. | |
| 6,045,724 A | 4/2000 | Varaprasad et al. | |
| 6,193,379 B1 | 2/2001 | Tonar et al. | |
| 6,246,507 B1 * | 6/2001 | Bauer et al. | 359/267 |
| 6,416,827 B1 | 7/2002 | Chakrapani et al. | |
| 6,522,451 B1 * | 2/2003 | Lynam | 359/265 |

FOREIGN PATENT DOCUMENTS

EP 0758929 (B1) 9/1997

OTHER PUBLICATIONS

U.S. Appl. No. 10/793,071, ElectrochromiX Inc.
U.S. Appl. No. 10/741,903, Los Alamos National.

* cited by examiner

*Primary Examiner*—Hung Xuan Dang
*Assistant Examiner*—Joseph Martinez
(74) *Attorney, Agent, or Firm*—Lawrence R. Oremland, P.C.

(57) ABSTRACT

This invention describes non-planar electrochromic mirrors that are made by combining planar electrochromic elements with non-planar reflectors. This results in lower cost mirrors by circumventing several issues related to the difficulty of making non-planar EC elements.

8 Claims, 11 Drawing Sheets

NON PLANAR MIRRORS WITH PLANAR ELECTROCHROMIC CAVITY

RELATED APPLICATION/CLAIM OF PRIORITY

This application is related to and claims priority from provisional application Ser. No. 60/474,653 filed May 30, 2003 which provisional application is incorporated by reference herein.

BACKGROUND OF THE INVENTION

Mirrors are used in many applications. Particularly for safety, rear-view mirrors are used in automobiles and other transportation modes including scooters, motorcycles and trucks. Variable reflection mirrors which automatically dim to reduce glare are used as rear-view mirrors in automobiles. The principal technology for these mirrors is called electrochromic (EC). The glare is sensed as a difference in the output between two light sensors (one positioned to look at rear illumination and the other to look into ambient illumination), processed by an electronic circuit, which then applies an electric stimulus to the EC cell. EC mirror becomes darker, hence less reflective when it is activated by this stimulus. Such mirrors and controls are described in many publications, particularly patent literature generated by Gentex Corporation (Zeeland, Mich.) and Donnelly Corporation (Holland, Mich., now Magna-Donnelly) and in U.S. patent application Ser. No. 10/793,071, filed Mar. 5, 2004 which is incorporated by reference herein. These mirrors are made both in planar and non-planar configurations. For example in the US the outside mirrors for automobiles are convex (non-planar) for the passenger side and flat (planar) for the driver side. In the US the interior rear-view automotive mirrors are planar. The non-planar EC mirrors are constructed using non-planar substrates. Typical construction of the EC mirrors involves use of two curved substrates which are bent to a high precision, and then providing an EC medium and the powering terminals for EC activation within the inwardly facing surfaces of these two substrates. Other types of auto-dimming mirrors based on liquid crystals and suspended particles may also be fabricated. This is an expensive process where twin substrates have to be precisely bent and kept in the same orientation relative to each other until they are assembled. Further, with changes in size, shape and curvature new bending dies are required which also add to cost and inventory. Some transparent conductors such as indium-tin oxide may not withstand the temperature of substrate bending (typically glass), thus rather than economically coating large sheets of glass and cutting them into shapes, a more expensive process is used where each shape has to be coated after bending. In any case, the use of bent substrates to make EC cells and maintain a constant gap between the two transparent conductors is more difficult and causes reduced yields and results in higher costs. This invention provides an alternative method of making non-planar auto-dimming mirror systems which use planar EC or an alternative light attenuating element in conjunction with a non-planar reflective element.

BRIEF SUMMARY OF THE INVENTION

This invention teaches the fabrication of non-planar variable reflectivity mirrors while using planar EC or an alternative variable light-attenuating device. This EC activity acts as a means of control of light passing through it. The EC device is then combined with a reflective element located behind the EC device which is not planar. This combination results in a non-planar EC mirror where the EC device is planar but the reflective surface is not planar. There are several ways of accomplishing this, as taught in this invention.

DETAILED DESCRIPTION OF THE INVENTION

Figure 1A:
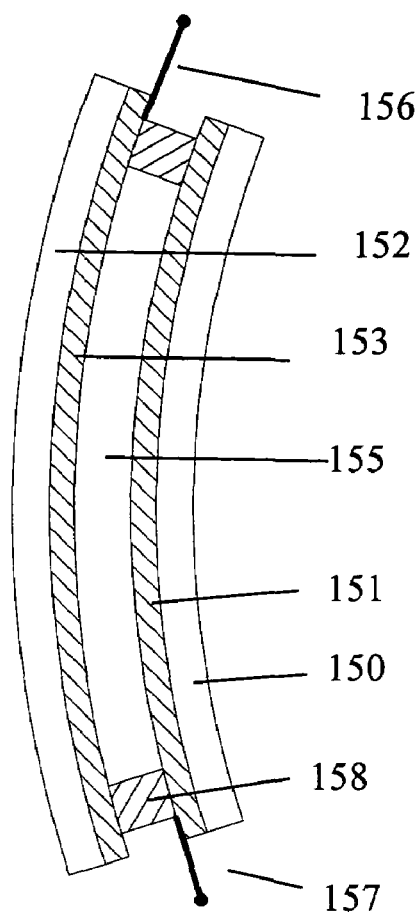
FIG. 1a is a cross section view of a schematic non-planar variable reflectance mirror as described in the prior-art.

This detailed description will largely focus on EC devices, but any light-attenuating window based on non-EC technologies may be substituted. EC elements may be fabricated in many different ways. In one construction two substrates are used. To form an EC element each of these is pre-coated with transparent conductors on one surface. The substrates are placed in a parallel relationship with the conductive coatings facing each other with a small gap between the two substrates. The gap is filled with an electrolyte. This is generally called a single compartment EC device, as there are no active coatings between the transparent conductors. In one formulation, the electrolyte comprises solvents, redox dyes and UV stabilizers (e.g., see U.S. Pat. Nos. 4,902,108; 5,998,617 and U.S. Pat. No. 6,045,724). These mirrors are self-erasing in the aspect, that when the activating power is removed, the mirrors bleach or go to a more reflective state.

A modification of the traditional single compartment is where the compartment is partitioned in more than one unit by utilizing multi-phase systems as described in U.S. patent application Ser. No. 10/793,071, filed Mar. 5, 2004. Another type of common self-erasing EC device for mirrors comprises of an EC coating on one of these substrates. In all cases an EC medium is sandwiched between at least two conductors. The electrolyte generally comprises at least one solvent, and a redox dye and possibly other ingredients such as redox dyes, polymers, soluble salts and UV stabilizers, details on such devices may be found in European patent application 00758929/EP B1 and U.S. Pat. No. 5,729,379 and U.S. patent application Ser. No. 10/741,903 filed on Dec. 19, 2003). Mirrors have also employed a third type of EC device where a single substrate is used, and several layers of electrodes and electrolytes are deposited to yield an EC element, examples of these are described in U.S. Pat. Nos. 4,652,090 and 4,712,879. Other devices using electrical activation will also be considered electrochromic for the purpose of this invention. Some of these include liquid crystal devices and suspended particle devices. Examples of these devices can be found in U.S. Pat. Nos. 4,676,601 and in 6,416,827. A brief description of several different EC device constructions is also described in U.S. Pat. No. 6,039,390 which is included by reference herein. A planar EC element is described where the surface conductors (e.g. transparent conductors) which activate the EC action do not reside on curved surfaces. Regardless of the type of the EC device, this invention is very useful for making non-planar mirrors using planar EC devices.

U.S. Pat. No. 6,246,507 describes non-planar EC mirrors which are made of EC elements which are not planar. They describe an EC element constructed of two bent substrates. This patent is included here by reference. It describes that for uniformity of coloration and to keep the image distortion to a minimum, the gap between the two substrates must be uniform. It also describes that if, for bending ease, thin glass substrates are chosen, then there are issues related to their fragility, vibration and bending. Thus, the patent prefers an electrolyte which is cross-linked when using thin glass substrates in a range of 1.5 to 0.5 mm thickness. In this reference, shapes are described which are non-spherical, typically multi-radii (e.g., see FIGS. 5a and 5b in U.S. Pat. No. 6,246,507), which makes the matching of the substrates difficult and expensive. Multi-radii mirrors are also described in U.S. Pat. No. 6,522,451 which is also incorporated by reference herein. The above patent achieves the multi-radii function by combining two separate elements, e.g. one planar and the other curved by assembling them on a back plate. A multi-radii mirror provides an undistorted view of the image in the planar area, and a wide field of view in the non-planar area, e.g., to be able to cover the blind spot for the automotive driver. Thus it is important to be able to make non-planar EC mirrors while not having the problems associated with non-planar EC elements. The present invention can be used to make multi-radii mirrors where the reflective element is a single piece or comprises several elements.

FIG. 1a shows an EC mirror construction according to the prior art. This construction comprises two bent substrates (usually glass) 150 and 152 which are respectively coated with electric conductors 151 and 153. Further, 153 is transparent and 151 is reflective. Cavity 155 comprises an electrochromic medium which is sealed by a perimeter sealant 158. The electrochromic mirror is activated by applying power to the two conductors via the connectors 156 and 157.

Figure 1B:
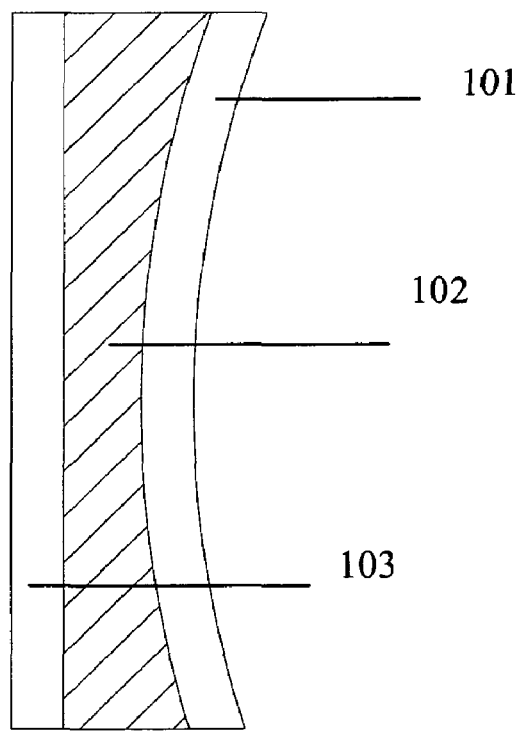
FIG. 1b is a, cross section view of a schematic of a non-planar variable reflectance mirror according to the present invention.

FIG. 1b shows a simple schematic of the innovative concept of the present invention. A planar transmissive EC element 103 is bonded, via a transparent material 102, to a curved (non-planar) reflector 101. The EC element is responsible for attenuating the light which reaches the reflector and then is reflected back through this element.

Figure 1C:
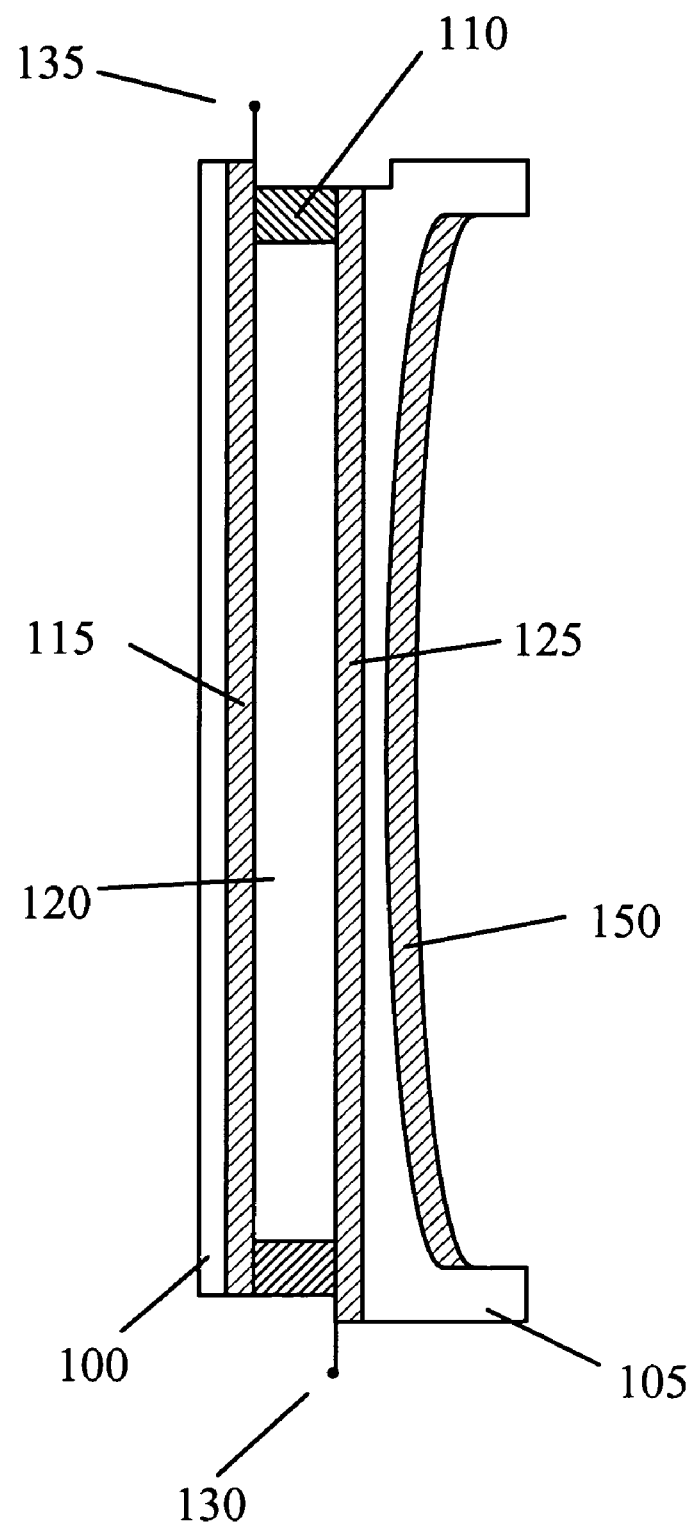
FIG. 1c is a cross section view of an EC Mirror schematics with planar single compartment EC device and a curved reflector according to the present invention.

FIG. 1c shows an embodiment of the present invention in more detail. Two substrates 100 and 105 are joined by a perimeter seal 110 resulting in a chamber 120. The inwardly facing surface of substrate 100 is coated with a transparent conductor 115. Similarly, the inwardly facing surface of substrate 105 is also coated with a transparent conductor 125. The two conductors are parallel to one another resulting in a uniform thickness of the EC cavity 120, which result in a planar EC element. These can be chosen from any of the conductors available. Some choices are indium-tin oxide, fluorine doped tin oxide and doped zinc oxide. Their resistivity for mirror applications is generally in the range of 1 to 100 ohms/square. The thickness of the gap 115 is generally from 10 to 1000 microns. This gap may be maintained by putting spacers in the sealant 110 and/or by incorporating the spacers in the gap itself. The spacers are not shown. The gap is filled with an electrochromic electrolyte. When the device is activated by applying power between the terminals 130 and 135, the transmission of the light passing through the electrolyte changes. The back side of the substrate 105 is curved (non-planar) and has a reflector 150. Appropriate adhesion promotion layers may be used to get good bonding between any of the coatings and the substrates. The reflector may also be protected from scratching by using additional layers such as silicon oxide hard coats or paints. The reflective coating may also serve as a heater or additional heaters may be placed in close proximity to defrost the mirrors when used as exterior automobile mirrors in cold weather. Masks may be placed before depositing reflective layers (or reflective layers etched later) to result in transparent windows in order to place displays so that they are visible through the EC window. Non-planar elements in this invention may have spherical or a aspherical bend (such as cylindrical) and may even be a combination of several curved geometries. For a spherical bend the radius of curvature should preferably be between 4000 mm to 50 mm. The reflectivity of the reflective surface for automotive mirrors should preferably be above 30% and more preferably above 50% at 550 nm or under photopic conditions. The reflector may be colorless or it may have a color. Thus the EC mirror when looked at from the side of the substrate 100 appears non-planar, but the cavity forming the EC device is planar. Further, any type of substrate composition may be used for this purpose, as long as it fulfils the requirements. For example, the substrate composition may be glass or plastic. It is preferred that the rear substrate 105 be molded out of a plastic material to keep the cost low, reduce weight and decrease susceptibility to breakage. Preferred plastic substrates are described in U.S. patent application Ser. No. 10/793,071, filed Mar. 5, 2004, which is incorporated herein by reference. The front substrate 100 may be made of glass or plastic. To reduce scratching of the front surface it may be coated with scratch resistant coatings (U.S. Pat. No. 6,193,379) or even be laminated with thin glass. A preferred glass for such lamination is below 1 mm thick and more preferably less than 0.5 mm thick, and preferably less than 0.1 mm thick (for example see Microsheet glass from Corning, (Ithaca, N.Y.) and D263T and AF45 glass from Schott Corp (Yonkers, N.Y.)).

Use of plastic substrates in EC cells is particularly enabled when these are in contact with electrolytes containing solvents as described in U.S. patent application Ser. No. 10/600,807, filed Jun. 20, 2003 and Ser. No. 10/793,071, filed Mar. 5, 2004 by using hydrophobic ionic liquids in the electrolytes. Both of these applications are incorporated by reference herein.

Figure 2:
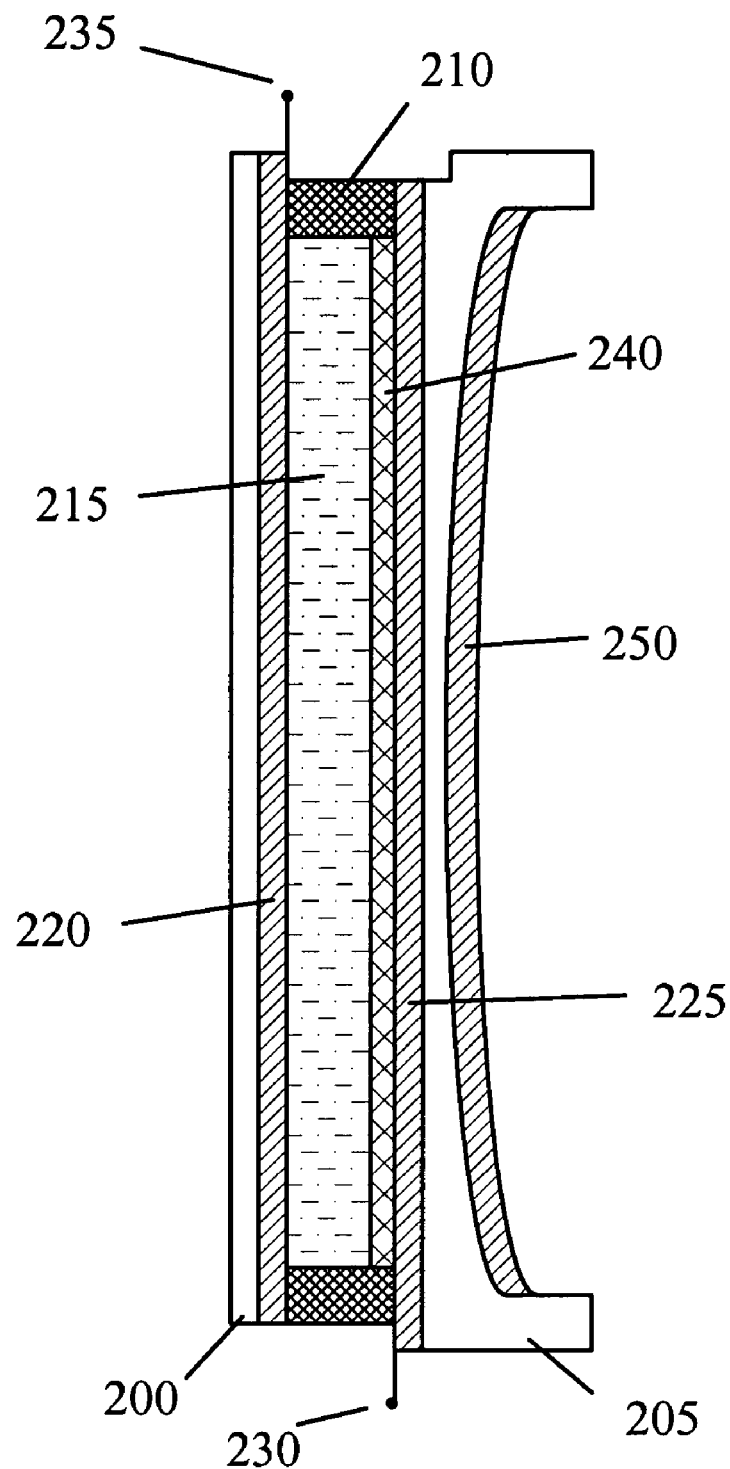
FIG. 2 is a cross section view of EC Mirror schematics with planar EC device having an EC coating and a curved reflector according to the present invention.

FIG. 2 shows another embodiment of this invention. Principally the difference in this case is the presence of an additional EC layer 240 deposited on top of the transparent conductor 225. Some examples of EC layer are tungsten oxide and polyaniline (European patent application 00758929/EP B1 and U.S. Pat. No. 5,729,379). The substrate 200 is coated with a transparent conductor 220 which is then sealed at the perimeter using an adhesive 210 to the substrate 205. The face of the substrate 205 facing the electrolyte 215 is coated with the transparent conductor 225 and a reflective layer 250 on its rear surface. The adhesives for the perimeter seal are preferably polymeric materials, which are cross-linked or are thermoplastic. An example of a thermoplastic sealing gasket is made from Surlyn™ (Dupont, Wilmington, Del.) polymer sheet (U.S. Pat. No. 5,233,461). An example of a thermoset material is an epoxy resin. For adhesion promotion surface treatments may be applied at the perimeter, or compounds promoting adhesion (e.g. silane coupling agents) may be added to the sealant itself. More details on the sealants may be found in U.S. patent application Ser. No. 10/793,071, filed Mar. 5, 2004.

Figure 3:
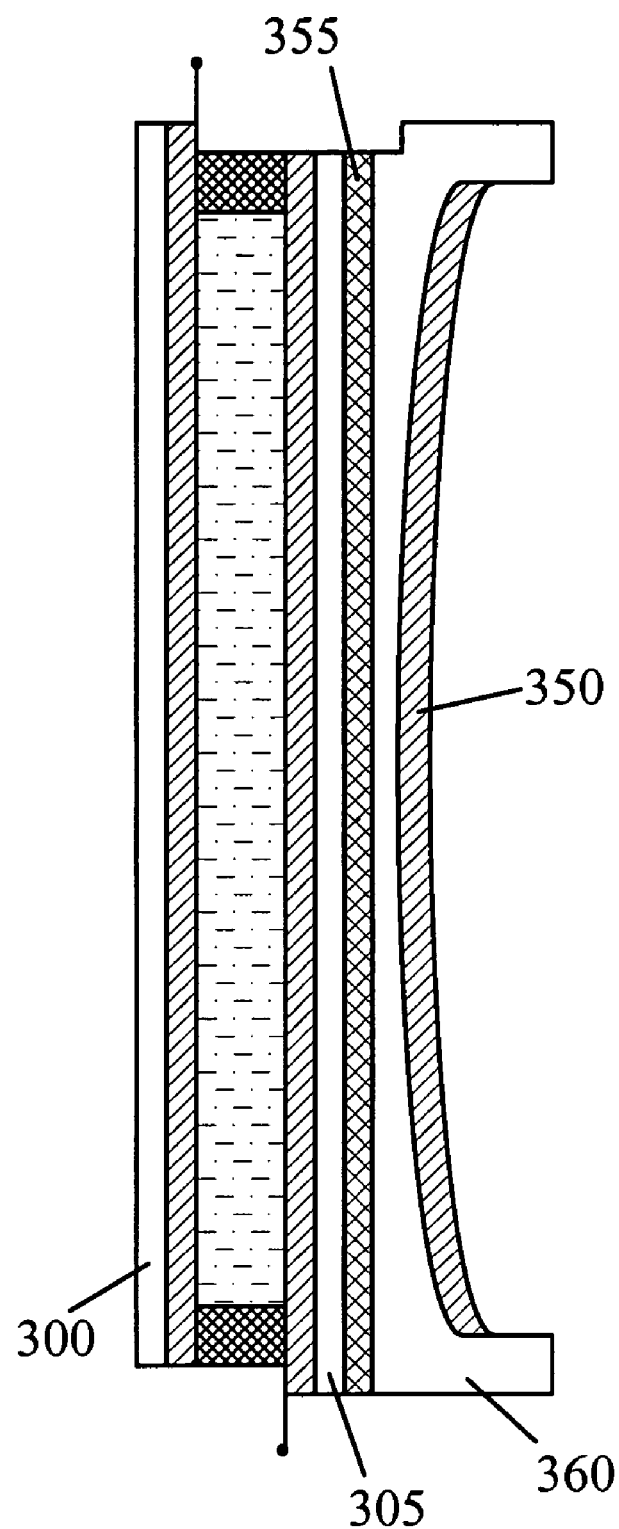
FIG. 3 is a cross sectional view of EC mirror schematics with planar single compartment EC device and a laminated curved reflector according to the present invention.

FIG. 3 shows yet another embodiment of this invention where an electrochromic element is constructed using two planar substrates 300 and 305. All the intervening layers between these substrates form the EC element as described in FIG. 1. A reflective element is formed by a third substrate 360 which is coated with a reflector 350 and is laminated (or bonded) to the EC element using a transparent layer shown by 355. Layer 355 may be an adhesive or a laminating film such as polyvinyl butyral (PVB), polyvinyl chloride or a polyurethane comprising material. A mechanical force, such as clamping, may also hold the two together with or without a gasket. For the purpose of this invention bonding and lamination will be used interchangeably. Examples of PVB laminating film are Saflex™ (Solutia, Saint Louis, Mo.) and Butacite™ (Dupont, Wilmington, Del.). A preferred thickness of the laminating film (or films if a stack is used) is less than 5 mm, and more preferably less than 1 mm. Preferably, the refractive index of the laminating layer should be similar to the refractive index of the substrate 305 and 360 to avoid multiple reflections. Preferably the value of refractive index of the substrates and the laminating film must be within 0.1 units of each other, or more preferably within 0.01 to avoid multiple reflections from the various interfaces. The perimeter of the laminated edge should preferably be protected from moisture, particularly when PVB is used for lamination, to avoid delamination in service. Some of the sealants used for this purpose are silicones, polyurethanes, butyl and polysulfides. These materials may be thermosetting or thermoplastic. These edge sealants may be applied after the complete device has been assembled to also encapsulate the perimeter of the EC cell on which the busbars are placed to power the EC devices. This results in increased robustness to the vibrations and other mechanical forces during service.

Figure 4:
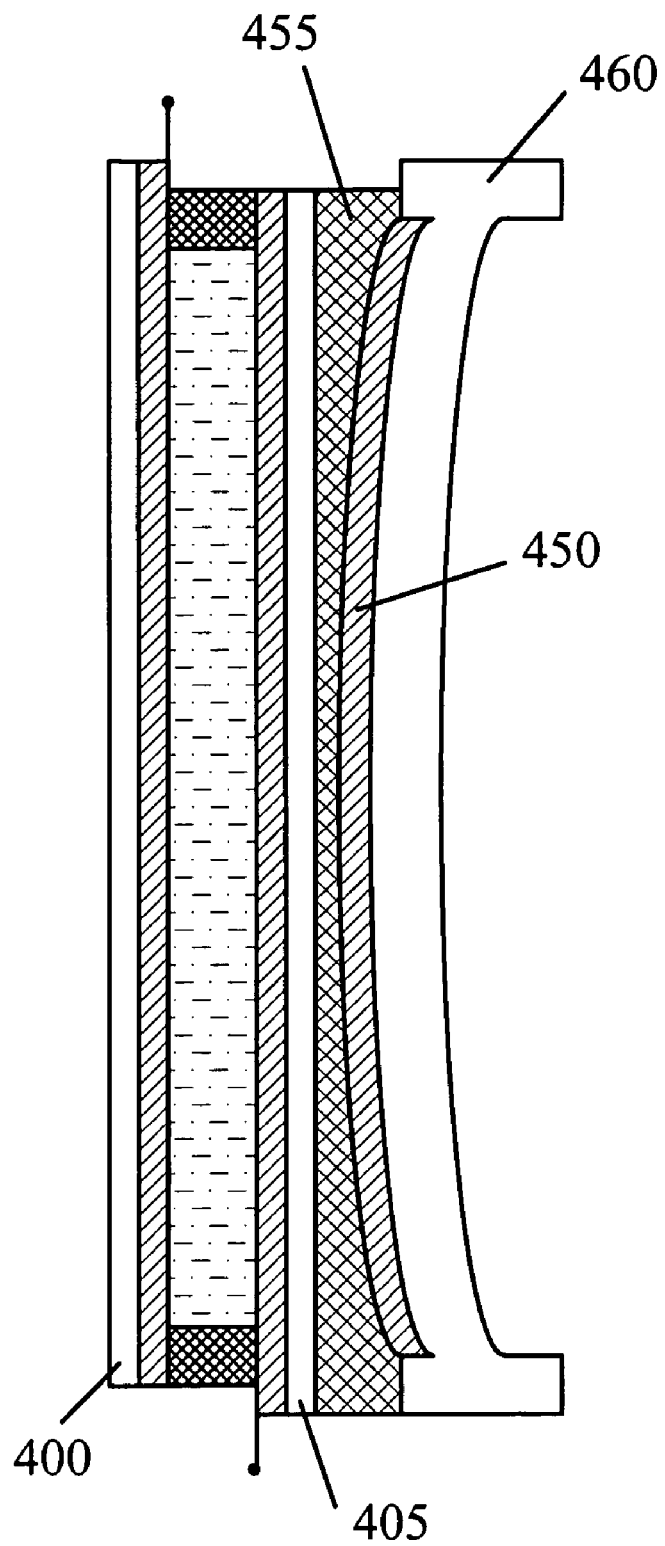
FIG. 4 is a cross section view of EC mirror schematics with planar single compartment EC device and a laminated curved reflector according to the present invention.

FIG. 4 shows yet another embodiment where the EC element formed using substrates 405 and 400 is laminated to a substrate 460 with the reflective element 450 facing inwards of the lamination. The laminating material is shown as 455. The element 460 is shown having both surfaces curved, however, the rear surface of the element 460 (which does not have the reflective layer) may be planar with EC cavity or it may have any other convenient shape. This may be plastic or glass. One may form this plastic element by molding; or even thermoforming a large sheet from which these elements may be cut. In this case the substrate 460 need not be transparent. Preferred plastic elements used should have a heat distortion temperature greater than 100° C. as described in U.S. patent application Ser. No. 10/793,071, filed Mar. 5, 2004. In this figure since the reflective layer is in contact with the laminating layer, the refractive index of only 405 and 455 needs to be matched.

Figure 5:
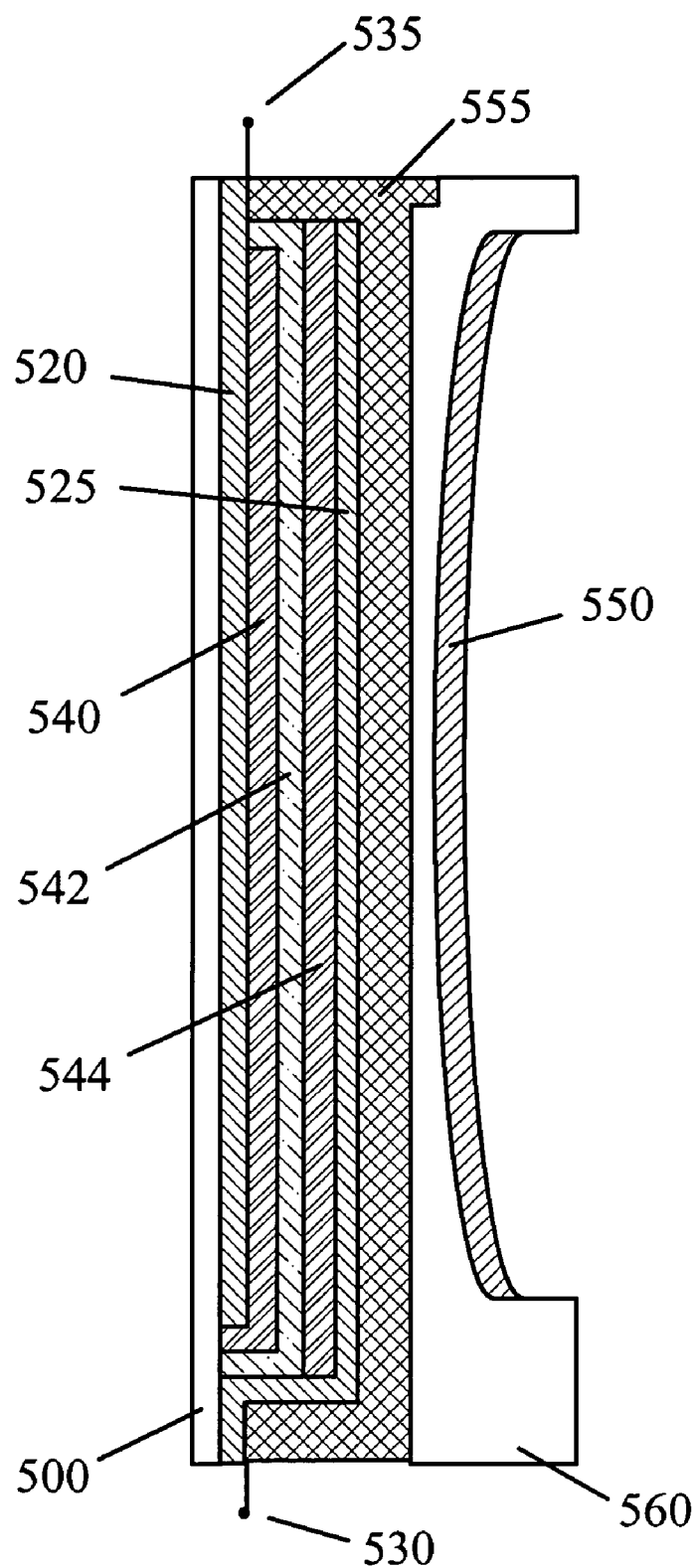
FIG. 5 is a cross section view of EC mirror schematics with single substrate EC device and a curved reflector according to the present invention.

FIG. 5 shows a planar EC element, which has been constructed, on a single substrate 500. A window EC element is made by sequentially depositing a transparent conductor 520 (e.g., indium-tin oxide) followed by an EC layer 540 (e.g., a cathodic material tungsten oxide, molybdenum oxide), ion conductor 542 (e.g., tantulum oxide) another electrochemically active electrode 544 (e.g., anodic EC material such as nickel oxide, iridium oxide) and followed by another layer of transparent conductor 525. The power is supplied by two conductors 535 and 530 in contact with the transparent conductors 520 and 525 respectively. These types of EC constructions are described in U.S. Pat. Nos. 4,652,090 and 4,712,879. This EC element is laminated using a laminating material 555 to another substrate 560 carrying the curved reflector 550. Depending on the desired construction, the reflector may be deposited on the side away from the lamination layer or in contact with it.

Figure 6:
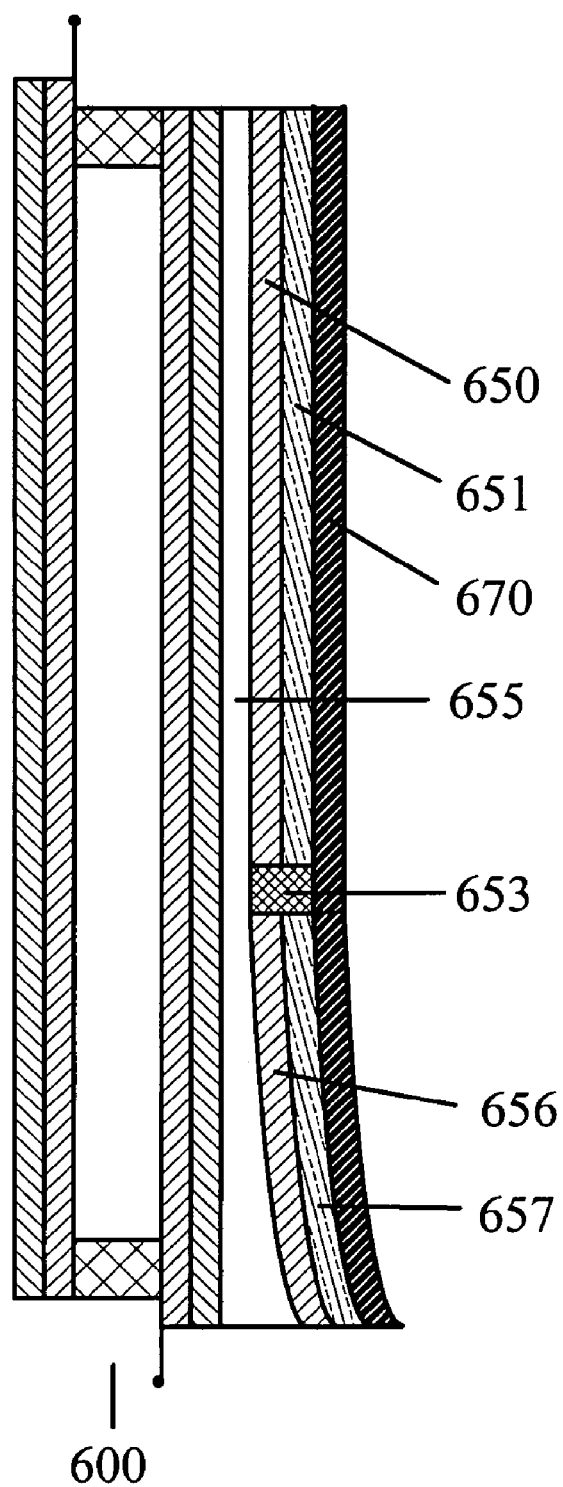
FIG. 6 is a cross section view of EC mirror with a planar EC element and two reflective elements of different curvature according to the present invention.

FIG. 6 shows a planar EC element, which is combined with a reflector comprising two reflective elements. The planar EC element is shown as 600. The reflective element consists of a planar reflective coating 650 (which is formed by depositing on a substrate 651) and a non-planar element coating 656 (which is formed by depositing on a substrate 657), both of which are placed on a backing plate 670. These may be bonded or laminated to the backing plate (the bonding or lamination layer is not shown). A small gap 653 between the two reflective elements is preferably filled with a dark colored (see U.S. Pat. No. 6,522,451, which is incorporated herein for more details) or diffusely reflective material. The purpose of this is to clearly indicate to the automobile driver the image distinction between the planar and non-planar area. The image in the non-planar area may be distorted and should not be confused with the one in the planar area. This assembly is then preferably laminated or bonded to the EC element using a laminating or bonding layer 655. For those multiple element reflectors in a single assembly, this method of demarcation between different curvatures may be used. If instead of using multiple elements a single element is used which has multiple curvatures, it is preferred that using a dark paint, the various areas should be visually separated for rear-view mirrors. The dark separator should preferably be black, brown and gray or diffusive in terms of reflection if it is made out of a lighter color. Any dark color separator is acceptable as long as it is visible to the driver when an image is observed while the EC element is in the dark (or the colored) state. There may be other configurations of the reflective element, e.g., reflective element may consist of a reflective foil or a plate, or they may be located between 651 and 670 as long as 651 is transparent.

Figure 7:
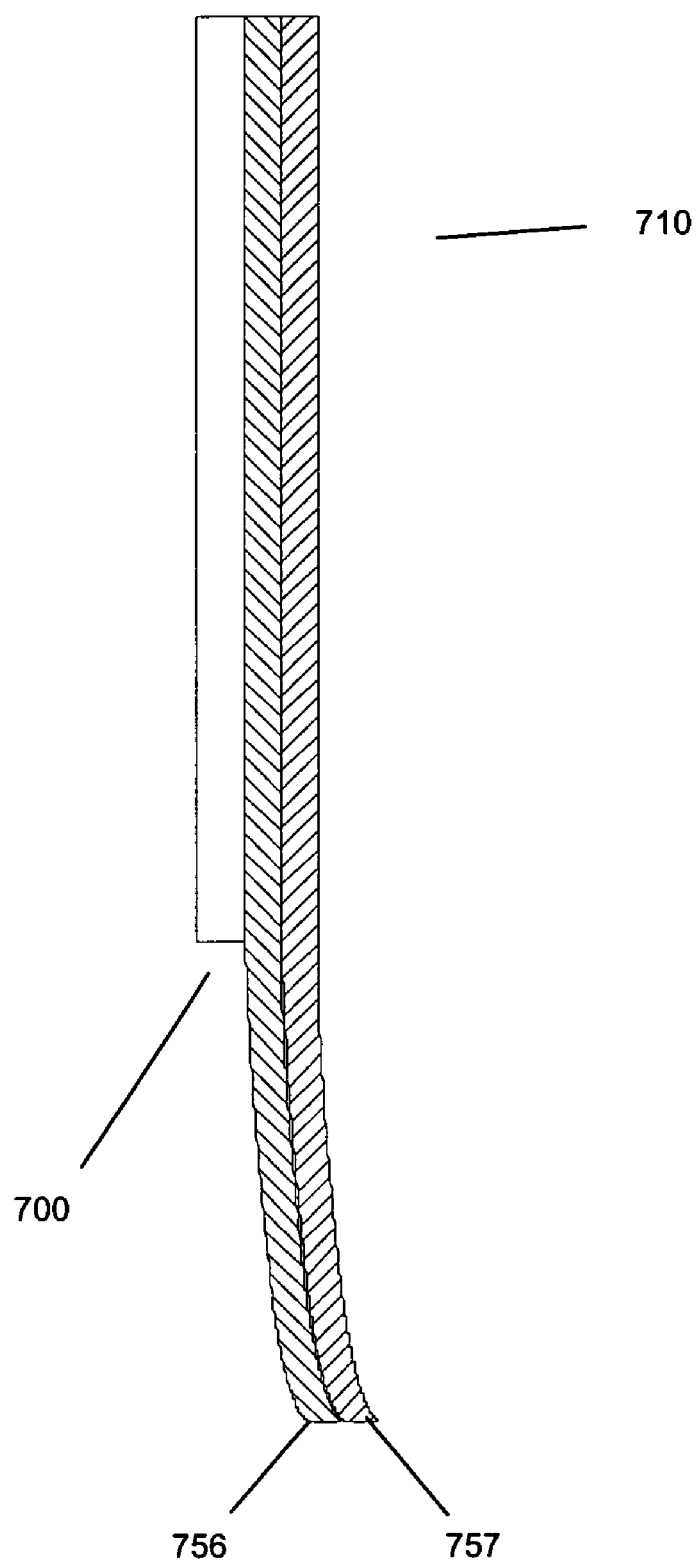
FIG. 7 is a cross section view of EC mirror with a planar EC element covering substantially the planar part of the multi-curvature reflector according to the present invention.

FIG. 7 shows a planar EC element 700 which is bonded to a reflective element 710. The reflective element 710 comprises of reflective layer 756 and substrate 757. The EC cell covers substantially the planar part of the reflector. Since the intensity of the glare from the convex or non-planar part are not as pronounced, one may assemble such mirrors in an inexpensive fashion for certain applications. The boundary of the EC element (or its sealant) may function as a demarcation between the planar and the non-planar part.

Figure 8B:
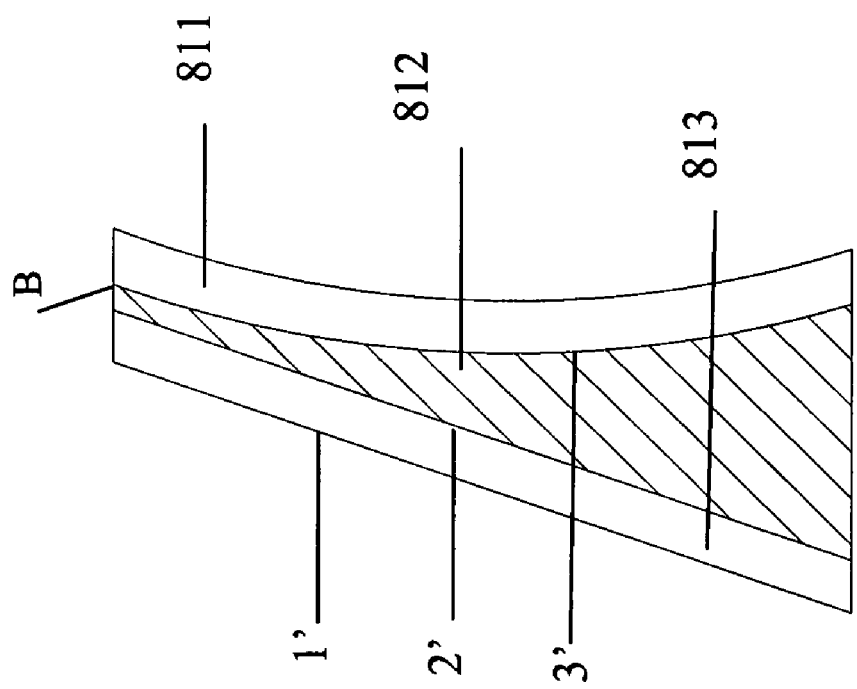
FIG. 8b is a cross section view of EC mirror configuration after rotating the EC element to eliminate multiple reflections according to the present invention.
Figure 8A:
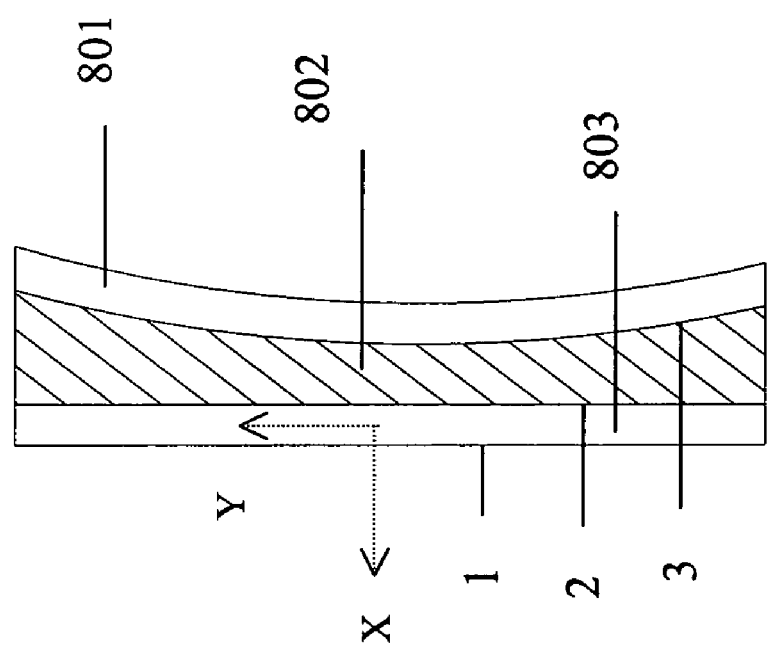
FIG. 8a is a cross section view of EC mirror configuration before rotating the planar EC element relative to the curved substrate according to the present invention.

FIG. 8b shows another configuration which eliminates reflection off the first surface being viewed by the driver. FIG. 8a shows a configuration described earlier where a planar light attenuating device 803 is bonded by a medium 802 to a reflector 801. Generally medium 802 is matched in refractive index to the surface of 803 it is in contact with. The various surfaces in this configuration are shown as 1, 2 and 3. If surface 1 is soda lime glass, it would reflect about 4% (due to mismatch in refractive index of air and glass) of light which may interfere with the desired image being formed from the reflection of surface 3, particularly when the EC medium is darkened. One way to eliminate the image from the front surface is by rotating the planar element about the Z axis (X and Y axes are shown, and Z axis is perpendicular to the plane of paper). The configuration after rotation is shown in FIG. 8b. Where a planar light attenuating device 813 is bonded by a medium 812 to a reflector 813. The orientation of the surface 1' may be so chosen that the image from this does not enter into the driver's vision, but is directed elsewhere. A preferred rotation of the front element is in an amount so that a tangent drawn at point "B" on the curved surface is parallel to the planar element. However, any angle of rotation around the Z axis would be fine as long as it meets the objective.

There are several variations to the theme described in FIG. 8. Depending on the mirror configuration one may rotate the planar substrate in more than one axis. For example it may be rotated around Z and Y axes so that there is more control of the direction of the unwanted image. Further, it may not be necessary to use an index matching material 812. As images from both surfaces 1' and 2' will be parallel and be pointed away from the car driver or the occupant. In an extreme case space 812 is either vacuum, air or another fluid where the EC device and the reflector are held in place by the mirror casing. Further, hot filtered air either from the engine or heated locally may be circulated through inlet and outlets in space 812 to heat the mirror. This space must be sealed so that particulates do not get in, as they may deposit on surfaces and cause visual faults. Heating may also be done through this gap by radiant means, conduction or convection. Heating may also be used as a means of controlling the mirror reflectivity. For example at higher temperature the current consumption of the mirror increases for the same applied potential. This has an effect of decreasing the effective potential between the two EC electrodes due to the Ohms law, and thus decreasing the level of coloration.

Figure 9:
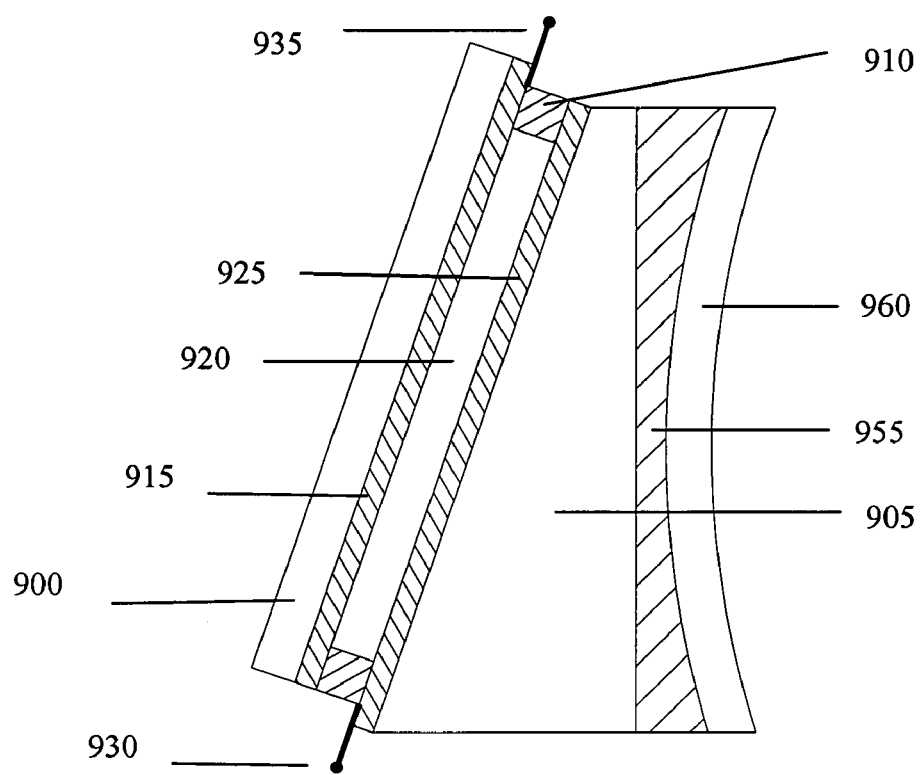
FIG. 9 is a cross section view of alternative EC mirror configuration to eliminate multiple reflections according to the present invention.

FIG. 9 shows an alternative way to eliminate multiple reflections based on the concept above. The planar EC device comprises of substrates 905 and 900. These are coated with transparent conductors 925 and 915 with an EC medium in 920. Since the transparent conductors encompassing the EC medium are parallel, this is a planar EC device. The EC medium is sealed by perimeter seal 910 and the device is powered by applying power to the connectors 935 and 930. This EC device is bonded to a curved reflector 960 using the material 955. One of the substrates 905 used to fabricate the EC device is prismatic. Although the orientation of the surface being bonded to the reflector is similar to 8a, but a slant on its other face achieves the same results in terms of eliminating the reflection from the first surface as in FIG. 8b.

The non-planar reflectors will typically have a radius of curvature in the range of 50 to 4000 mm. The non-planar reflector element may be in several configurations, some of which are illustrated in U.S. Pat. No. 6,522,451. The non-planar element may even be located in the center of the planar element.

These EC mirrors not only comprise of EC cell but a host of other accompanying features when integrated into a housing to be mounted onto the automobiles. Many examples of these added features are given in patent application U.S. patent application Ser. No. 10/793,071, filed Mar. 5, 2004. Some of these are displays, sensor ports (or sensors, such as light sensor), lights (for reading, turn signals, safety and courtesy), heaters, and exterior coatings. Some of these exterior coatings may provide self cleaning, hydrophobic and hydrophilic properties. The displays for external mirrors include turn signals and in the interior mirrors used for compass, temperature, warnings and information. The exposed surface of the reflector carrying surface may be laminated with a heating element or a heating element may be co-molded.

Figure 10:
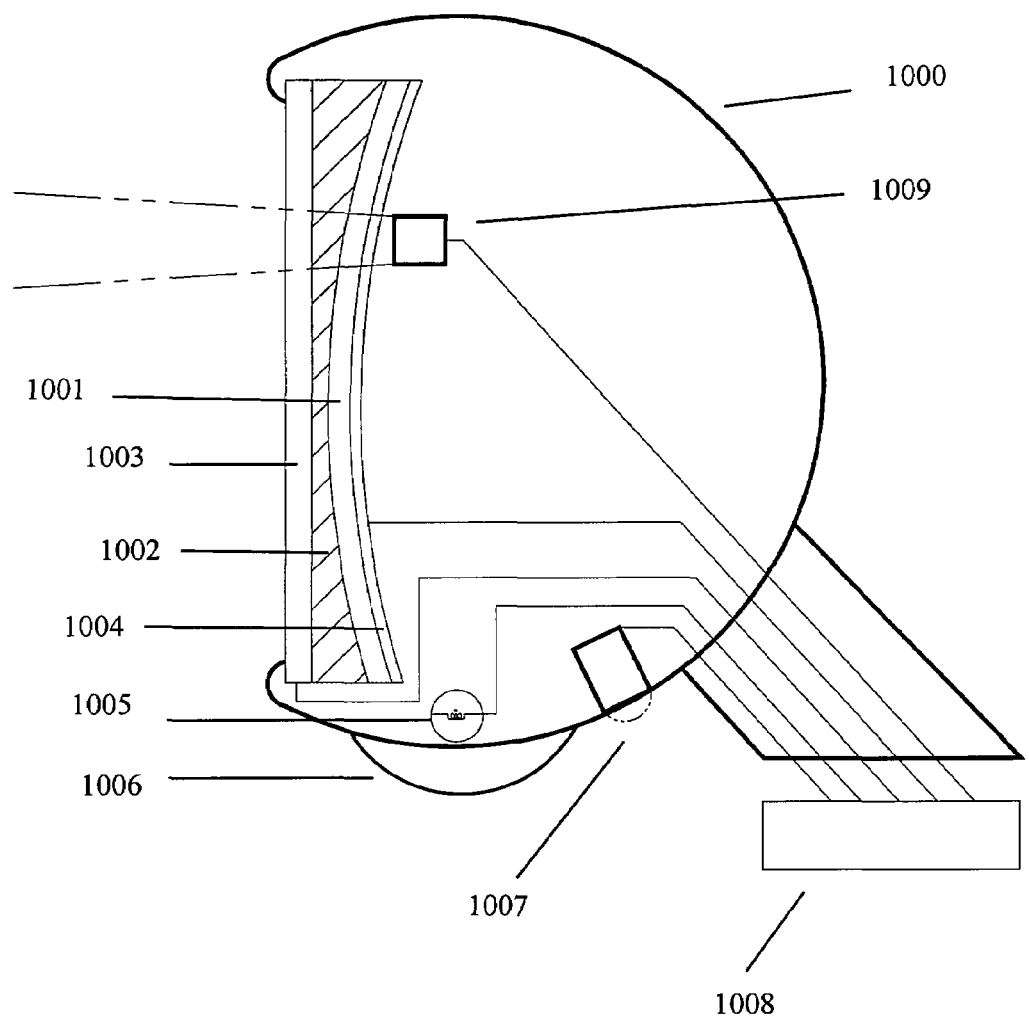
FIG. 10 is a schematic cross sectional view of an exterior vehicular EC mirror system according to the present invention, and further showing support structure for and EC device that can be used according to the present invention.

FIG. 10 schematically shows support structure for, and auxiliary devices that can be used with an EC mirror, according to the principles of the present invention. The EC mirror is preferably configured as a rear-view mirror for a vehicle that can be supported on to the interior or exterior of the vehicle. As illustrated in FIG. 10, where the mirror 1000 is an exterior mirror. The planar EC element, bonded by a material 1002 to the curved reflector 1001. FIG. 10 schematically shows a display 1009 which is for turn signals and is viewed by other vehicles approaching this vehicle from the rear (for interior mirrors, temperature, compass information or other warnings may be displayed), a heater 1004 which may be used to defrost the front surface of the mirror in cold weather, a courtesy lamp 1005 and a lens 1006 where the lamp may be illuminated at night when the driver approaches a parked vehicle or unlocks it remotely (for interior mirrors reading lights may be provided). The sensor 1007 is for measurement of temperature, but there may be more sensors such as light sensors to detect glare, ambient illumination conditions, compass sensor, global positioning sensor, garage door opening transmitter, etc. The EC element, sensor, heater and the lamp are connected to a control box 1008 for control and powering. This control box may be outside of the mirror housing and located in another mirror housing (e.g. in interior mirror), or inside the vehicle, or these may be connected to different control boxes. The display may also be located between the EC element and the reflective element. It may even be formed using organic or inorganic thin coatings on one of the surfaces enclosing the space between the reflector and the EC device. More on display coatings composition and device structure is described in U.S. patent application Ser. No. 10/793,071, filed Mar. 5, 2004. Other features in an exterior mirror such as motors for tilting the mirrors are not shown but may be incorporated.

The reflective layer shown in various embodiments may be a metallic foil or plate, multi-layer reflective coating or a metallic coating. Some preferred metals are silver, rhodium, aluminum, chrome, stainless steel, nickel and their alloys. One may design the resistance profile of the reflective layer so that it also serves as a resistive heater. For this the preferred materials, are chromium, nickel and its alloys. Heaters are generally employed for exterior mirrors for defrosting in cold weather. Non-planar elements may be placed inside the planar area, e.g., a convex reflective button being bonded to a planar reflective surface, where this is then bonded to a planar EC element. One may also prepare planar EC mirrors by bonding planar reflective elements to the planar EC elements. This is particularly useful if the reflective element is on a plastic substrate so the mirror can have better shatter resistance.

These devices may be fabricated in a variety of ways. For example, the EC element may be fabricated separately and then later assembled with the reflective elements. In another variation, the EC cavity (for those EC devices requiring two substrates) may be assembled without the electrolyte. The reflector element may be deposited or assembled before the cavity is filled with an electrolyte. In another alternative the rear substrate (pre-coated with transparent conductor or other coatings) being used for the EC device is first used to assemble the reflective elements. This is then used to assemble an EC cavity on its other side by using an additional conductively coated substrate. The EC cavity is then filled with the electrolyte and sealed. Any of these or other variations may be chosen to assemble non-planar EC mirrors of this invention. The non-planar reflective element may not extend to the very edge of the EC substrate if one wants to employ clip busbars to power the devices and their positioning interferes with the lamination of the two elements.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A non-planar variable reflectivity mirror comprising a variable planar light attenuating device and at least one non-planar reflective element in spaced relation to the variable planar light attenuating device so as to reflect light transmitted through the variable planar light attenuating device, the planar light attenuating device comprising an electrochromic (EC) device, and attenuation of light by the planar light attenuating device determining the color and/or brightness of the light reflected from the non planar reflective element and transmitted by the planar light attenuating device.

2. A non-planar variable reflectivity mirror as in claim 1 where the light attenuating device is bonded to the reflective element.

3. A non-planar variable reflectivity mirror as in claim 1 where the reflective element is one of convex and multi-radius.

4. A non-planar variable reflectivity mirror as in claim 1 further including support structure that enables the mirror to be connected with a vehicle in such a manner that the mirror forms a mirror for the vehicle.

5. A non-planar variable reflectivity mirror as in claim 4 wherein the support structure is configured for connection to the interior and exterior of a vehicle so that the mirror can be used for at least one of an interior mirror and exterior mirror.

6. A non-planar variable reflectivity mirror as in claim 1, where at least one of the substrates used for the EC device and the reflective element are made out of a polymeric material.

7. A non-planar variable reflectivity mirror as in claim 1 where more than one reflective element is used.

8. A non-planar variable reflectivity mirror as in claim 1 where the mirror is integrated with at least one of: a display, a heater, a sensor and a light.

* * * * *